T. S. GRIMES.
SHAFT COUPLING.
APPLICATION FILED JULY 26, 1916.
1,227,432.
Patented May 22, 1917.
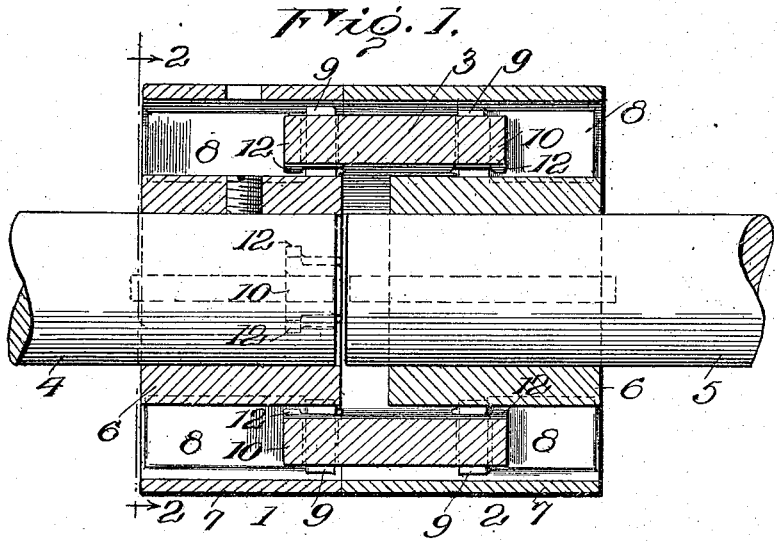
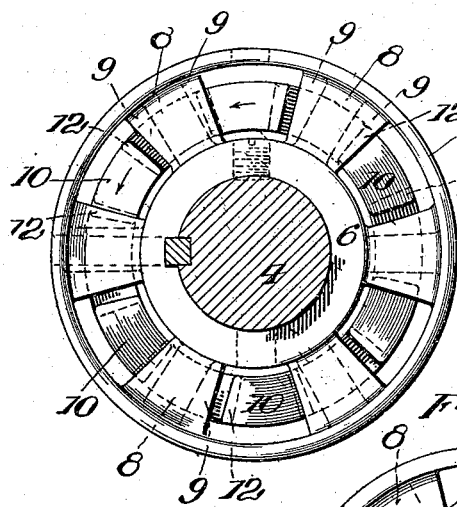
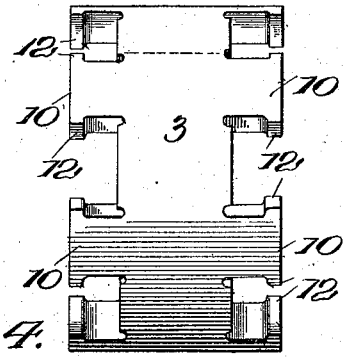
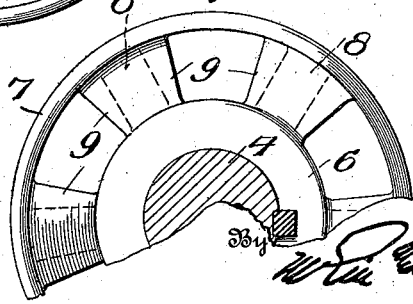
Inventor
T. S. Grimes.
Attorneys

UNITED STATES PATENT OFFICE.

THADDEUS S. GRIMES, OF COLUMBUS, GEORGIA, ASSIGNOR TO LUMMUS COTTON GIN COMPANY, OF COLUMBUS, GEORGIA, A CORPORATION OF GEORGIA.

SHAFT-COUPLING.

1,227,432.  Specification of Letters Patent.  Patented May 22, 1917.

Application filed July 26, 1916. Serial No. 111,419.

*To all whom it may concern:*

Be it known that I, THADDEUS S. GRIMES, of Columbus, in the county of Muscogee and State of Georgia, have invented certain new and useful Improvements in Shaft-Couplings, and I do hereby declare the following to be a full, clear, and exact description of the invention, such as will enable others skilled in the art to which it appertains to make and use the same.

This invention relates to shaft couplings, and the object of the invention is to provide a device of this character, which in addition to being of simple and economical construction, embodies improved and efficient means for insuring a dependable connection between the ends of two shafts, whether the same be in, or slightly out of, alinement, and a device of the type referred to which may readily be disconnected without the necessity of removing bolts or other fastening media. The device is particularly adapted for connecting the saw shaft of one cotton gin with that of the next gin.

In the accompanying drawings, Figure 1 is a vertical section. Fig. 2 is a section on line 2—2, Fig. 1. Fig. 3 is a view of the intermediate coupling member. Fig. 4 is a detail of one of the rings.

Referring to the drawings, the device as a whole comprises two coupling rings 1 and 2 and an interposed coupling member 3, the rings 1 and 2 being designed to be respectively secured to the adjacent ends of two shafts 4 and 5. These rings are of cylindrical formation and each has a hub 6, which is designed to fit over the end of a shaft and to be keyed thereto, and a rim 7 spaced from the hub by radially extending webs 8. At one end each of the connecting webs is formed with oppositely extending lateral flanges 9 with which locking tongues of the member 3 are designed to engage, such tongues fitting in the spaces between the webs 8.

The coupling member or sleeve 3 is of smaller diameter than the rings 1 and 2, but, like such rings, is cylindrical. Adjacent portions of the hubs of the rings are designed to be received in the bore of the coupling member. The latter is provided on each side with a series of spaced-apart laterally-extending tongues 10, each having shoulders 12 at its outer end. As before stated, the tongues are designed to be received in the spaces between the webs 8 of the rings 1 and 2, one of the shoulders of each tongue and a lateral flange of each web interengaging to form a secure connection between the coupling rings.

It will be noted that the ring 2 is of greater width than the ring 1 and that the flanges 9 of the ring 2 are about centrally disposed of such ring, while the corresponding flanges of the ring 1 lie approximately at the edge of the rim. By this arrangement, which allows of the coupling member 3 being wider than would be possible if the flanges were at the rim of both coupling rings, I am enabled to provide for a greater difference in the alinement of the shafts. An additional advantage of this construction is the slight extent of movement of the coupling ring required for the purposes of disconnecting the parts.

In practice, the coupling ring 1 is slipped on the end of a shaft and secured fast thereto. The complementary ring 2 is then placed on the end of the opposite shaft in keyed relation thereto but not secured as against longitudinal movement. The coupling member 3 may then be inserted and the ring 2 moved up so that the locking tongues of the member 3 may be engaged with the flanged webs of the two rings. By leaving the ring 2 free to slip longitudinally over the shaft there is no danger of one shaft pulling or crowding the other endwise. In whichever direction the parts are driven there will be an engagement between a shoulder of each tongue and a flange of each web, the parts thus being held securely in working position.

It is apparent that the coupling may serve the additional purpose of a pulley for driving other machinery, the unobstructed rims being readily adaptable for the application of a belt.

I claim as my invention:

1. A shaft coupling comprising a pair of rings each having a series of spaced apart radially extending projections, and a coupling sleeve having a series of laterally extending tongues for engaging the projections of said rings.

2. A shaft coupling comprising rings designed to be secured to opposite shaft ends, said rings each having a series of spaced apart radially extending projections, and said projections having flanges at one end, and a coupling member having a series of laterally extending shouldered tongues for engaging the projections of said rings and interlocking with the flanges thereof.

3. A shaft coupling comprising rings designed to be secured to opposite shaft ends, said rings each having a hub and a rim and radially extending members connecting said hub and rim, and a coupling member having a bore to receive portions of the hub of each of said rings and means for engaging the radially extending members of said rings.

4. A shaft coupling comprising rings designed to be secured to opposite shaft ends, said rings each having a hub and a rim and radially extending members connecting said hub and rim, said radially extending members each having oppositely extending flanges at one end, and a coupling member having a series of laterally extending shouldered tongues for engaging said radially extending members of said rings.

5. A shaft coupling comprising rings designed to be secured to opposite shaft ends, one of said rings being fast on one shaft and the other free to slide longitudinally of the opposite shaft, said rings each having a series of spaced apart radially extending projections, and a coupling member having a bore to receive a portion of each of said rings and a series of laterally extending tongues for engaging the projections of said rings.

In testimony whereof, I have signed this specification in the presence of two subscribing witnesses.

THADDEUS S. GRIMES.

Witnesses:
  THOMAS O. OTT,
  WM. F. LUPO.

Copies of this patent may be obtained for five cents each, by addressing the "Commissioner of Patents, Washington, D. C."